(12) United States Patent
Kitaura et al.

(10) Patent No.: US 7,074,471 B2
(45) Date of Patent: Jul. 11, 2006

(54) OPTICAL INFORMATION RECORDING MEDIUM, METHOD FOR PRODUCING THE MEDIUM, AND METHOD AND APPARATUS FOR RECORDING INFORMATION USING THE MEDIUM

(75) Inventors: Hideki Kitaura, Souraku-gun (JP); Noboru Yamada, Hirakata (JP); Rie Kojima, Kadoma (JP); Takeshi Sakaguchi, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 142 days.

(21) Appl. No.: 10/808,962

(22) Filed: Mar. 24, 2004

(65) Prior Publication Data

US 2004/0191686 A1    Sep. 30, 2004

(30) Foreign Application Priority Data

Mar. 27, 2003    (JP) .............................. 2003-088906

(51) Int. Cl.
*B32B 3/02*    (2006.01)
(52) U.S. Cl. .................. 428/64.1; 428/64.4; 428/64.5; 428/64.6; 430/270.13
(58) Field of Classification Search ............... 428/64.5; 430/270.13
See application file for complete search history.

(56) References Cited

U.S. PATENT DOCUMENTS

| | | | | |
|---|---|---|---|---|
| 5,221,588 | A * | 6/1993 | Morimoto et al. ............. | 430/19 |
| 5,709,978 | A * | 1/1998 | Hirotsune et al. ..... | 430/270.13 |
| 5,784,355 | A | 7/1998 | Abe | |
| 6,153,063 | A | 11/2000 | Yamada et al. | |
| 6,159,573 | A * | 12/2000 | Zhou ......................... | 428/64.1 |
| 6,268,034 | B1 | 7/2001 | Kitaura et al. | |
| 6,280,810 | B1 | 8/2001 | Nakamura et al. | |
| 6,312,780 | B1 * | 11/2001 | Kasami et al. ............. | 428/64.1 |
| 6,388,978 | B1 | 5/2002 | Ogawa et al. | |
| 6,551,679 | B1 | 4/2003 | Kuroda et al. | |
| 2002/0187424 | A1 | 12/2002 | Nagata et al. | |
| 2003/0161257 | A1 * | 8/2003 | Yusu et al. ................. | 369/285 |
| 2004/0191683 | A1 * | 9/2004 | Nishihara et al. ...... | 430/270.11 |

FOREIGN PATENT DOCUMENTS

| | | |
|---|---|---|
| EP | 0 294 932 | 12/1988 |
| EP | 0 706 177 | 4/1996 |
| EP | 2001-126252 | 10/1999 |
| EP | 1 213 715 | 6/2002 |

(Continued)

*Primary Examiner*—Elizabeth Mulvaney
(74) *Attorney, Agent, or Firm*—Hamre, Schumann, Mueller & Larson, P.C.

(57) ABSTRACT

An optical information recording medium of the present invention includes a transparent substrate and a multi-layered film provided on the transparent substrate. The multi-layered film includes at least a recording layer that is changed between two or more different states capable of being detected by irradiation with a light beam, and a light absorbing layer in this order from a side close to the transparent substrate. The recording layer contains a material represented by a formula: $Ge_x(Bi_ySb_{1-y})_2Te_{x+3}$ (where $x \geq 5$ and $0 < y \leq 1$) as a main component. Such a multi-layered film including a recording layer also is applicable to a multi-layered recording medium including a first information layer to an N-th information layer (N is an integer of 2 or more) disposed on a transparent substrate in this order from a side close to the transparent substrate. In this case, at least one of the first information layer to the N-th information layer has the same configuration as that of the multi-layered film.

24 Claims, 6 Drawing Sheets

| FOREIGN PATENT DOCUMENTS | | |
|---|---|---|
| EP | 1 324 326 | 7/2003 |
| EP | 1 351 229 | 10/2003 |
| JP | 5-926663 | 3/1991 |
| JP | 5-217211 | 8/1993 |
| JP | 2000-215516 | 8/2000 |
| KR | 1992-2931 | 4/1992 |
| KR | 2001-20233 | 10/2002 |
| WO | 97/34298 | 9/1997 |
| WO | 99/44199 | 9/1999 |

\* cited by examiner

OPTICAL INFORMATION RECORDING MEDIUM, METHOD FOR PRODUCING THE MEDIUM, AND METHOD AND APPARATUS FOR RECORDING INFORMATION USING THE MEDIUM

BACKGROUND OF THE INVENTION

1. Field of the Invention

The present invention relates to an optical information recording medium capable of recording/reproducing an information signal by irradiating a thin film formed on a substrate with a high-energy light beam such as a laser, a method for producing the medium, and a method and apparatus for recording information using the medium.

2. Description of the Related Art

A thin film made of a chalcogen material or the like formed on a substrate is irradiated with laser light to be heated locally, whereby a phase can be changed between an amorphous phase and a crystalline phase having different optical constants refractive index n; extinction coefficient k) due to the difference in irradiation conditions. This has already been well-known, and a so-called phase-change type optical information recording medium using this phenomenon has been researched and developed, and commercialized actively.

In a phase-change type optical information recording medium, an information track is irradiated with laser light, with the laser output being modulated in accordance with an information signal between at least two power levels (i.e., recording level and erasure level), whereby a new signal can be recorded while an existing signal is being erased.

In such an optical information recording medium, generally, in addition to a recording layer, a protective layer made of a dielectric material or the like having excellent heat resistance and a reflective layer made of a metal/alloy material or the like are provided. The protective layer is formed on a lower side (i.e., on a side dose to a transparent substrate that is a laser light incident side) of the recording layer, and on an upper side (i.e., on a side opposite to the transparent substrate) of the recording layer, for the purpose of preventing evaporation of the recording layer and thermal deformation of the substrate during repeated recording, and enhancing the light absorbance and optical change of the recording layer by an optical interference effect, etc. The reflective layer is formed on a side opposite to the transparent substrate with respect to the recording layer, for the purpose of using incident light efficiently, and increasing a cooling speed so as to obtain an amorphous phase easily, etc.

To provide an interface layer between a recording layer and a dielectric layer is proposed (e.g., see JP 5(1993)-217211 A and WO 97/34298). It is desirable that the interface layer has functions of promoting crystallization of a recording layer to enhance erasure characteristics, preventing interdiffusion of atoms and molecules between a recording layer and a dielectric protective layer to enhance durability during repeated recording, and the like. The interface layer also is desired to have environmental reliability that prevents peeling and corrosion between the recording layer and the dielectric layer Furthermore, to provide a material layer having a high refractive index, absorbing light appropriately, between an upper dielectric layer and a reflective layer also is proposed (e.g., see JP 2000-215516 A). The purpose of providing such a material layer is to adjust the ratio between a light absorbance in the case where a recording layer is crystalline and a light absorbance in the case where the recording layer is amorphous, so as not to allow a mark shape to be deformed during overwriting. This enhances an erasure ratio, and increases the difference between reflectance in the case where the recording layer is crystalline and reflectance in the case where the recording layer is amorphous to increase a C/N ratio, etc.

As a basic means for increasing the amount of information to be accumulated in one such optical information recording medium, there is a method for shortening the wavelength of laser light or increasing the numerical aperture of an objective lens for collecting the laser light, thereby decreasing a spot size of the laser light to enhance a recording surface density. It is the recent tendency to use an optical system with a wavelength of 660 nm and a numerical aperture of about 0.6, as in a recording digital versatile disk (DVD). Furthermore, the following also is considered: a blue laser diode emitting light with a wavelength in the vicinity of 400 nm, which is approaching a practical stage, is used to enhance the numerical aperture to about 0.85. When the numerical aperture is enhanced in such a manner, the allowable width of the optical information recording medium with respect to a tilt is decreased. Therefore, to decrease the thickness of a transparent. substrate on a laser light incident side from 0.6 mm of a recording DVD to about 0.1 mm also is proposed.

A recording medium having a multi-layered configuration (hereinafter, referred to as a "multi-layered recording medium"), in which a plurality of layers for recording/reproducing information are stacked so as to increase the amount of information to be handled by one medium, also is proposed. In such a multi-layered recording medium, an information layer on a side close to a laser light source absorbs light, so that an information layer on a side away from the laser light source is recorded/reproduced with attenuated laser light, which causes a decrease in sensitivity during recording and a decrease in reflectance/amplitude during reproducing. Thus, in the multi-layered recording medium, it is necessary to increase the transmittance of the information layer on a side close to the laser light source and to increase the reflectance, reflectance difference, and sensitivity of the information layer on a side away from the laser light source, thereby enabling sufficient recording and reproducing characteristics to be obtained with a limited laser power.

In the optical information recording medium, it is important to enhance a recording density as described above. It also is important to increase a recording speed so as to handle a great amount of data in a short period of time. In order to handle high-speed recording, it is necessary to increase a crystallization speed of a recording layer. In a typical recording material Ge—Sb—Te, in particular, a composition in the vicinity of GeTe—$Sb_2Te_3$ (a composition in the vicinity of GeTe—$Sb_2Te_3$ line in the triangular phase diagram of Ge, Sb, and Te), it is known that Sn is substituted for a part of Ge, whereby a crystallization speed is increased.

As described above, the recording speed of a newly developed recording and reproducing apparatus tends to increase, and there is a demand for a medium that can handle such the tendency. Simultaneously, in order to keep compatibility with respect to an existing drive that performs recording only at a low speed, it is necessary that the same medium also can be recorded at a low speed. In order for a medium to handle high-speed recording, it is necessary to use a recording layer with a high crystallization speed as described above. When such a recording layer is used for recording at a low speed, a crystallization speed is too high. More specifically, an amorphous phase is unlikely to be formed, and a mark is unlikely to be large, which decreases the signal amplitude. In particular, in the case where Sn is substituted for a part of Ge as described above, a change in an optical constant between a crystalline phase and an amorphous phase is decreased, which may promote the decrease in a signal amplitude.

SUMMARY OF THE INVENTION

An optical information recording medium of the present invention includes a transparent substrate and a multi-layered film provided on the transparent substrate. The multi-layered film includes at least a recording layer that is changed between two or more different states capable of being detected optically by irradiation with a light beam, and a light absorbing layer in this order from a side dose to the transparent substrate, and the recording layer contains a material represented by a formula: $Ge_x(Bi_ySb_{1-y})_2Te_{x+3}$ (where $x \geq 5$ and $0 < y \leq 1$) as a main component.

Herein, the main component refers to that occupying 80 atomic % or more.

According to another aspect, the present invention is directed to a method for producing an optical information recording medium including, on a transparent substrate, a multi-layered film including at least a recording layer that is changed between two or more different states capable of being detected optically by irradiation with a light beam, and a light absorbing layer in this order from a side dose to the transparent substrate. The recording layer is formed so as to contain a material represented by a formula: $Ge_x(Bi_ySb_{1-y})_2Te_{x+3}$ (where $x \geq 5$ and $0 < y \leq 1$) as a main component.

Furthermore, the present invention provides a method and apparatus for recording information onto the above-mentioned optical information recording medium. According to an information recording method of the present invention, information is recorded onto an optical information recording medium including, on a transparent substrate, a multi-layered film including at least a recording layer that is changed between two or more different states capable of being detected optically by irradiation with a light beam, and a light absorbing layer in this order from a side close to the transparent substrate. The recording layer contains a material represented by a formula: $Ge_x(Bi_ySb_{1-y})_2Te_{x+3}$ (where $x \geq 5$ and $0 < y \leq 1$) as a main component, and while the medium is rotated, the information is recorded with a laser power modulation pulse waveform set in such a manner that as a linear velocity of the medium is increased, a value obtained by dividing a time integration of a light-emission power by a maximum light-emission power is higher.

An information recording apparatus of the present invention records information onto an optical information recording medium including, on a transparent substrate, a multi-layered film including at least a recording layer that is changed between two or more different states capable of being detected optically by irradiation with a light beam, and a light absorbing layer in this order from a side close to the transparent substrate. The recording layer contains a material represented by a formula: $Ge_x(Bi_ySb_{1-y})_2Te_{x+3}$ (where $x \geq 5$ and $0 < y \leq 1$) as a main component, and while the medium is rotated, the information is recorded with a laser power modulation pulse waveform set in such a manner that as a linear velocity of the medium is increased, a value obtained by dividing a time integration of a light-emission power by a maximum light-emission power is higher.

The recording method and recording apparatus of the present invention includes a recording and reproducing method for reproducing information before and after recording information or simultaneously time with recording, and a recording and reproducing apparatus including a reproducing mechanism together with an information recording mechanism.

These and other advantages of the present invention will become apparent to those skilled in the art upon reading and understanding the following detailed description with reference to the accompanying figures.

DESCRIPTION OF THE PREFERRED EMBODIMENTS

An optical information recording medium of the present invention includes a multi-layered film in which a recording layer containing a material represented by a formula: $Ge_x(Bi_ySb_{1-y})_2Te_{x+3}$ as a main component and a The optical information recording medium may be a multi-layered recording medium that includes a first information layer to an N-th information layer (N is an integer of 2 or more) placed on a transparent substrate in this order from a side close to the transparent substrate. In this case, at least one of the first information layer to the N-th information layer is set to be the above-mentioned multi-layered film. In the case of providing a plurality of information layers, although there is no particular limit, it is preferable to apply a multi-layered film configuration as described above to at least an information layer (N-th information layer) placed farthest from the transparent substrate. The reason for this is as follows. As an information layer is placed farther away from the transparent substrate, the information layer is required to have higher sensitivity. Satisfactory sensitivity is obtained by applying the above-mentioned multi-layered film.

In the optical information recording medium, assuming that the refractive index of the light absorbing layer is $n_1$, and the extinction coefficient of the light absorbing layer is $k_1$, it is preferable that $3 \leq n_1 \leq 6$ and $1 \leq k_1 \leq 4$. Furthermore, the light absorbing layer may contain at least one element selected from Ti, Zr, Hf, V, Nb, Ta, Cr, Mo, W, Mn, Os, Ga, In, C, Si, Ge, Sn, Pb, Sb, and Bi. In this case, it is preferable that the light absorbing layer contains at least one element selected from Si and Ge. The light absorbing layer as described above has a high refractive index and absorbs light appropriately, so that a satisfactory C/N ratio and an erasure ratio can be obtained in an effectively wide range of linear velocity.

In the above-mentioned optical information recording medium, it is preferable that the multi-layered film further includes a lower dielectric layer placed on a side close to the transparent substrate with respect to the recording layer. It is preferable that the thickness of the lower dielectric layer is 135 nm or less. The thin lower dielectric layer is advantageous for reducing the production cost of a recording medium. Although there is no particular lower limit to the thickness of the lower dielectric layer, the lower dielectric layer preferably is 5 nm or more. Furthermore, assuming that the thickness of the lower dielectric layer is d, the refractive index of the lower dielectric layer is $n_2$, and the wavelength of a light beam for recording or reproducing information is $\lambda$, it is preferable that $n_2 d \leq 7\lambda/16$, and more preferable that $0 < n_2 d \leq 3\lambda/16$ or $\lambda/4 \leq n_2 d \leq 7\lambda/16$.

In the optical information recording medium, it is preferable that the multi-layered film further includes an upper dielectric layer placed on an opposite side of the transparent substrate with respect to the recording layer. The thickness of the upper dielectric layer preferably is 15 nm to 80 nm, and more preferably is 25 nm to 60 nm.

The optical information recording medium further may include a lower interface layer between the lower dielectric layer and the recording layer, and further may include an upper interface layer between the recording layer and the upper dielectric layer. When the interface layer is formed, it is easy to improve erasure characteristics and repeated recording characteristics. It is preferable that at least one selected from the lower interface layer and the upper interface layer is made of a material containing or preferably a material mainly containing at least one kind of oxide selected from oxides of Ti, Zr, Hf, V, Nb, Ta, Cr, Mo, W, and Si.

In the optical information recording medium, the multi-layered film further may include a reflective layer placed on an opposite side of the transparent substrate with respect to the light absorbing layer.

According to a method for producing an optical information recording medium of the present invention, when a multi-layered film including a recording layer and a light absorbing layer is formed, the recording layer is formed so as to contain mainly a material represented by a formula: $Ge_x(Bi_y Sb_{1-y})_2 Te_{x+3}$. Therefore, an optical information recording medium having satisfactory recording and reproducing characteristics in a wide range of linear velocity can be obtained.

The method for producing an optical information recording medium of the present invention also is applicable to the case of a multi-layered recording medium including a first information layer to an N-th information layer (N is an integer of 2 or more) placed on a transparent substrate in this order from a side close to the transparent substrate. In this case, at least one of the first information layer to the N-th information layer is set to be the above-mentioned multi-layered film.

According to the method for producing an optical information recording medium, when the multi-layered film is formed, it is preferable that a lower dielectric layer is formed so as to be placed on a side close to the transparent substrate with respect to the recording layer. It is preferable that the thickness of the lower dielectric layer is 135 nm or less. Although there is no particular lower limit to the thickness of the lower dielectric layer, the thickness of the lower dielectric layer preferably is 5 nm or more.

According to a method and apparatus for recording information of the present invention, satisfactory recording and reproducing characteristics can be kept in a wider range of linear velocity with respect to the optical information recording medium of the present invention. Furthermore, even in the case where the optical information recording medium of the present invention is a multi-layered recording medium including a first information layer to an N-th information layer, similar effects can be obtained.

Hereinafter, the present invention will be described by way of embodiments with reference to the drawings. FIGS. 1 to 4 are partial cross-sectional views respectively showing an exemplary configuration of the optical information recording medium of the present invention.

Figure 1:
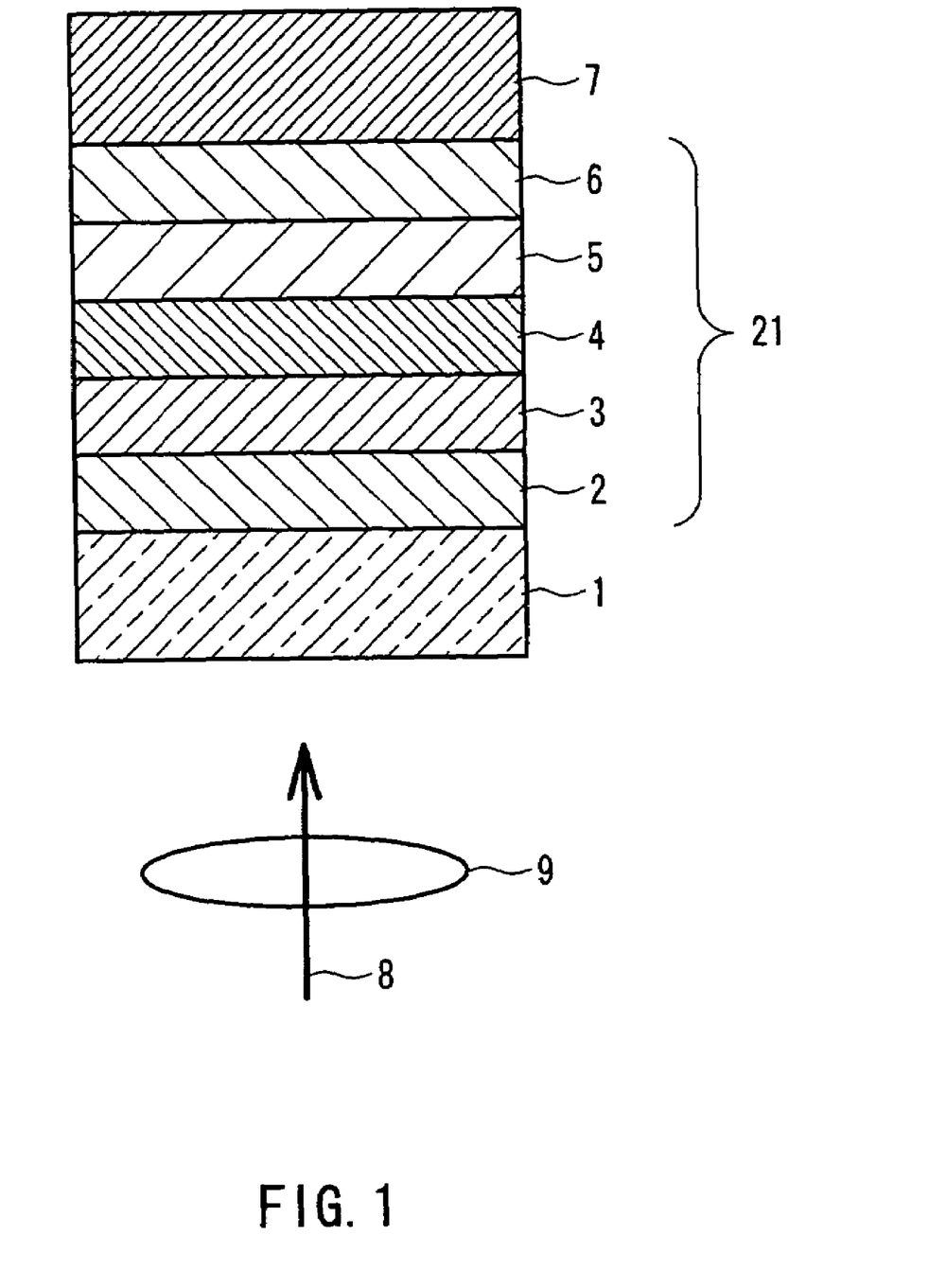
FIG. 1 is a cross-sectional view showing one exemplary configuration of an optical information recording medium of the present invention.

As shown in FIG. 1, in the optical information recording medium of the present embodiment, a multi-layered film 21 and a protective substrate 7 are provided in this order on a transparent substrate 1. The multi-layered film 21 includes a lower dielectric layer 2, a recording layer 3, an upper dielectric layer 4, a light absorbing layer 5, and a reflective layer 6 in this order from a side dose to the transparent substrate 1. Information is recorded onto or reproduced from the optical information recording medium by condensing laser light 8 from the transparent substrate 1 side with an objective lens 9 and irradiating the recording layer 3 with the laser light 8.

Figure 2:
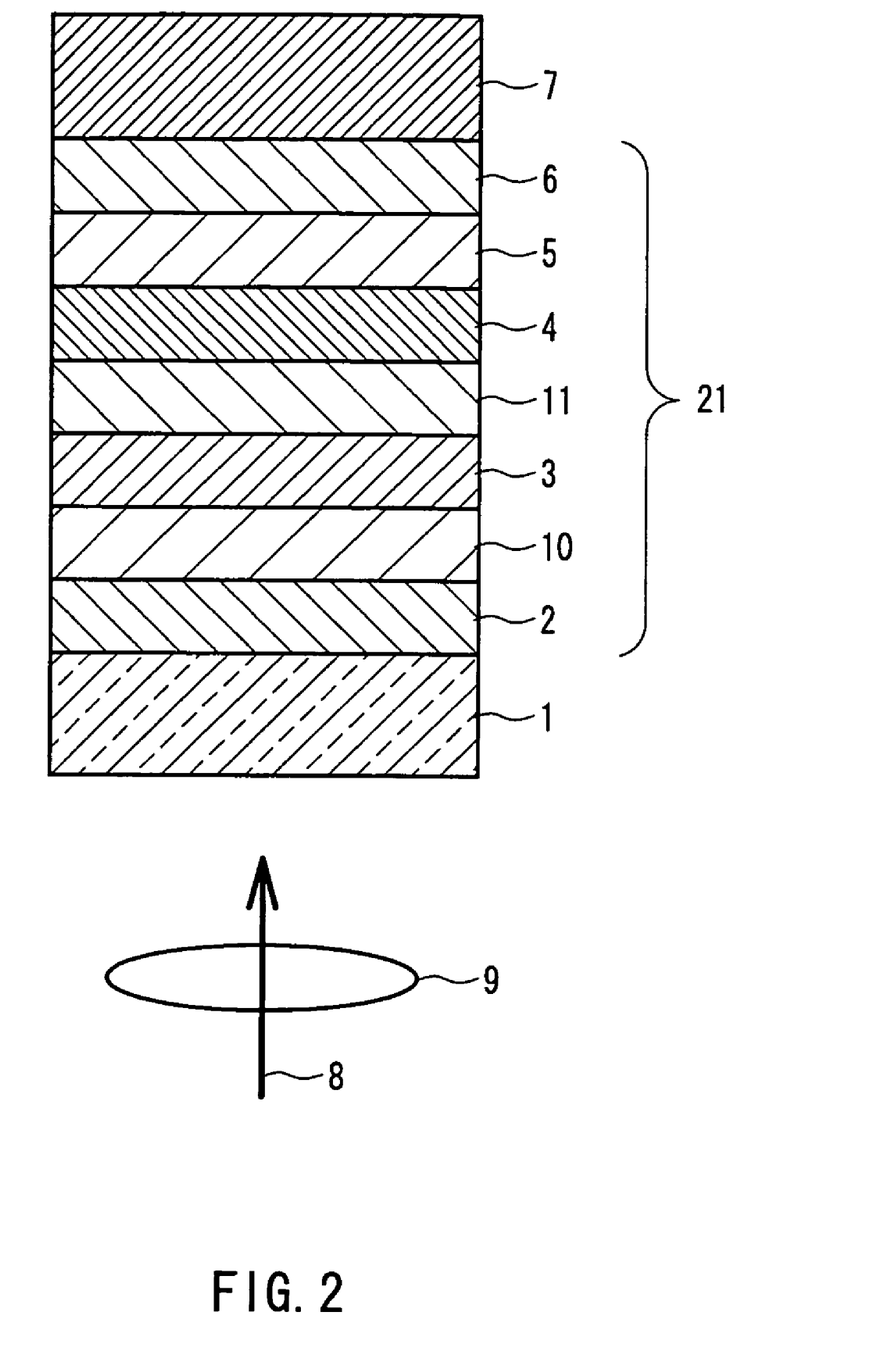
FIG. 2 is a cross-sectional view showing one exemplary configuration of the optical information recording medium of the present invention.

As shown in FIG. 2, in the multi-layered film 21, a lower interface layer 10 may be provided between the lower dielectric layer 2 and the recording layer 3, and an upper interface layer 11 may be provided between the recording layer 3 and the upper dielectric layer 4. Alternatively, only one of the lower and upper interface layers 10 and 11 may be provided.

It is preferable that the material for the transparent substrate 1 is substantially transparent in a wavelength of the laser light 8. Polycarbonate resin, polymethyl methacrylate resin, polyolefin resin, norbornane resin, UV-curable resin, glass, an appropriate combination thereof, or the like can be used. Furthermore, although there is no particular limit to the thickness of the transparent substrate 1, the thickness can be set in a range of about 0.01 to 1.5 mm.

As the materials for the lower dielectric layer 2 and the upper dielectric layer 4, for example, an oxide of Y, Ce, Ti, Zr, Nb, Ta, Co, Zn, Al, Si, Ge, Sn, Pb, Sb, Bi, Te, or the like; a nitride of Ti, Zr, Nb, Ta, Cr, Mo, W, B, Al, Ga, In, Si, Ge, Sn, Pb, or the like; a carbide of Ti, Zr, Nb, Ta, Cr, Mo, W, Si, or the like; a sulfide, a selenide or a telluride of Zn, Cd, or the like; a fluoride of rare-earth elements such as Mg, Ca, La, or the like; an element such as C, Si, Ge, or the like; or a mixture thereof can be used. Among them, a material (e.g., a mixture of ZnS and $SiO_2$) that is substantially transparent and has a low thermal conductivity is preferable. The lower dielectric layer 2 and the upper dielectric layer 4 may be made of different materials and have different compositions, or may be made of the same material and have the same composition, if required. Herein, the thickness of the upper dielectric layer 4 preferably is 15 nm to 80 nm, and more preferably 25 nm to 60 nm. When the thickness of the upper dielectric layer 4 is too small, the distance between the recording layer 3 and the reflective layer 6 is too short. Consequently, the cooling effect of the reflective layer 6 is enhanced, and the heat diffusion from the recording layer 3 is increased to decrease recording sensitivity. Furthermore, the recording layer 3 becomes unlikely to be crystallized. In contrast, when the upper dielectric layer 4 is too thick, the distance between the recording layer 3 and the reflective layer 6 is too long. Consequently, the cooling effect of the reflective layer 6 is decreased, and the heat diffusion from the recording layer 3 is decreased, making it difficult for the recording layer 3 to be changed to an amorphous phase.

Some of the materials exemplified as those for the lower dielectric layer 2 and the upper dielectric layer 4 play a role as the materials for the lower interface layer 10 and the upper interface layer 11. For example, a nitride based on Ge, Si, or the like; an oxide of Ti, Zr, Hf, V, Nb, Ta, Cr, Mo, W, Si, or the like; or a complex oxide thereof can be used. Among them, an oxide of Ti, Zr, Hf, V, Nb, Ta, or the like with an oxide of Cr, Mo, W, or the like added thereto is excellent in terms of moisture resistance. Furthermore, a material with an oxide of Si or the like added thereto can enhance an erasure ratio. There is no particular limit to the thicknesses of the lower interface layer 10 and the upper interface layer 11. However, when they are too thin, they cannot exhibit the effect as an interface layer. When they are too thick, the recording density is decreased and the like. Therefore, it is preferable that the thickness is 0.2 nm to 20 nm, for example. Even if only one of the lower interface layer 10 and the upper interface layer 11 is provided, the above-mentioned effect can be exhibited. However, both of them preferably are provided. In the case of providing both of them, they may be made of different materials and have different compositions, or may be made of the same material and have the same composition, if required.

It is preferable that the material for the recording layer 3 is represented by a formula: $Ge_x(Bi_ySb_{1-y})_2Te_{x+3}$ (x and y are the same as described above). In the recording layer 3, the reflectance and reflectance change can be increased by setting $x \geq 5$. Although there is no particular upper limit to x, it is preferable that $x \leq 50$. It is more preferable that y satisfies $0.1 \leq y \leq 0.9$. For the purpose of adjusting a crystallization speed, a thermal conductivity, an optical constant, etc., or enhancing durability for repeated use, heat resistance, environment reliability, etc., metal such as Sn, In, Ga, Zn, Cu, Ag, Au, Cr, or additional Ge, Bi, Sb, Te, etc.; semimetal or a semiconductor element; one or a plurality of elements selected from non-metal elements such as O, N, F, C, S, B, and the like may be added to the recording layer 3 appropriately in a range of 20 atomic % or less, preferably 10 atomic % or less, and more preferably 5 atomic % or less of the entire recording layer 3.

In the case where the recording layer 3 contains the above-mentioned elements, the material for the recording layer 3 can be represented by a formula: $(Ge_x(Bi_ySb_{1-y})_2Te_{x+3})_{1-z}A_z$, where x, y and z are numerical values in a range of $x \geq 5$, $0 < y \leq 1$, $0 \leq z \leq 0.2$ (preferably, $0 \leq z \leq 0.1$, more preferably $0 \leq z \leq 0.05$ A is at least one kind of element selected from Sn, In, Ga, Zn, Cu, Ag, Au, Cr, Ge, Bi, Sb, Te, O, N, F, C, S, and B.

When the thickness of the recording layer 3 is set to be in a range of 2 nm to 20 nm, a sufficient C/N ratio can be obtained. When the thickness of the recording layer 3 is less than 2 nm, a sufficient reflectance and reflectance change are not obtained, so that a C/N ratio is low. When the thickness is more than 20 nm, the heat diffusion in a thin film surface of the recording layer 3 is large, so that a C/N ratio is low in high-density recording. Furthermore, it is more preferable that the thickness of the recording layer 3 is in a range of 4 nm to 14 nm.

The light absorbing layer 5 is required to have a high refractive index and to absorb light appropriately, for the purpose of adjusting the ratio between a light absorbance in the case where the recording layer 3 is crystalline and a light absorbance in the case where the recording layer 3 is amorphous, so as not to allow a mark shape to be deformed during overwriting. This enhances an erasure ratio particularly at a high linear velocity, and increases the difference between reflectance in the case where the recording layer 3 is crystalline and reflectance in the case where the recording layer 3 is amorphous to increase a C/N ratio, etc. Thus, as the light absorbing layer 5, for example, a material having a refractive index $n_1$ of 3 to 6, and an extinction coefficient $k_1$ of 1 to 4; more preferably a material having a refractive index $n_1$ of 3 to 5, and an extinction coefficient $k_1$ of 1.5 to 3 may be used. Furthermore, as the light absorbing layer 5, a material containing at least one element selected from Ti, Zr, Hf, V, Nb, Ta, Cr, Mo, W, Mn, Os, Ga, In, C, Si, Ge, Sn, Pb, Sb, and Bi may be used. More specifically, it is preferable to use an amorphous Ge alloy or Si alloy such as Ge—Cr, Ge—Mo, Si—Cr, Si—Mo, Si—W, or the like; crystalline metal such as Ti, Zr, Nb, Ta, Cr, Mo, W, SnTe, PbTe, or the like; semimetal; and a semiconductor material. Among them, a material containing at least one element selected from Si and Ge is preferable. In particular, a Si-based material is more preferable as it has satisfactory heat resistance due to a melting point higher than that of Ge, and has a large C/N ratio due to a high thermal conductivity.

By combining the above-mentioned recording layer 3 with the light absorbing layer 5, a C/N ratio and an erasure ratio can be kept high even in a wide range of linear velocity.

Furthermore, in producing an optical information recording medium including such a multi-layered film, it is preferable that the thickness of each layer is smaller in terms of a production cost. Above all, it is more preferable to prescribe the thickness of a layer, which requires the longest period of time for forming, to be small. This is because the waste of time can be eliminated to enhance the efficiency, for forming each layer of the multi-layered film simultaneously in parallel in separate chambers. For example, in the case of a DVD-RAM or the like, the thickness of the lower dielectric layer between the substrate on the laser light incident side and the recording layer is large (i.e., about 150 nm), and hence, the lower dielectric layer requires the longest period of time for forming. However, if the thickness of the lower dielectric layer is prescribed to be small, a reflectance and a reflectance change are decreased, and the resultant recording medium is not suitable for a practical use. Therefore, it is difficult merely to prescribe the thickness of the lower dielectric layer to be small. Furthermore, the decrease in a reflectance by prescribing the thickness of the lower dielectric layer to be small can be compensated by prescribing the thickness of the upper dielectric layer to be small. However, when the thickness of the upper dielectric layer is too small, the recording layer is too close to the reflective layer. Consequently, the heat diffusion from the recording layer is increased due to the cooling effect of the reflective layer, whereby the recording sensitivity is decreased and the recording layer becomes unlikely to be crystallized. Therefore, to prescribe the thickness of the upper dielectric layer to be small for the above purpose is not preferable. Irrespective of such a problem, in the optical information recording medium with a film configuration as in the present embodiment, even if the thickness of the lower dielectric layer 2 is prescribed to be small, a sufficient reflectance and reflectance change are obtained, and characteristics as a practical information recording medium can be satisfied. For example, in the case of using a dielectric material containing a mixture of 80 molecular % of ZnS and 20 molecular % of $SiO_2$ for the lower dielectric layer 2 at a wavelength of 660 nm, the thickness of the lower dielectric layer 2 can be decreased to 135 nm or less (which used to be about 150 nm in a conventional example), and furthermore, to 125 nm or less. The range of the thickness d depends upon the refractive index $n_2$ of a dielectric material and the wavelength $\lambda$. Therefore, generally, it is preferable that $n_2 d \leq 7\lambda/16$. It is more preferable that $0 \leq n_2 d \leq 3\lambda/16$ or $\lambda/4 \leq n_2 d \leq 7\lambda/16$.

As a material for the reflective layer 6, for example, Au, Ag, Cu, Al, Ni, Cr, or an alloy material based on these elements is used. Among them, an Ag alloy is preferable due to a high thermal conductivity and a high reflectance. An Al alloy also is preferable in terms of a cost. Furthermore, the reflective layer 6 may include a combination of a plurality of layers.

In the above-mentioned multi-layered film, the material and composition of each layer can be checked by Auger electron spectroscopy, X-ray photoelectron spectroscopy, secondary ion-mass spectrography, or the like (for example, "Thin film Production Handbook" edited by The Japan Society of Applied Physics/Thin Film Surface Physics Division, Kyoritsu Shuppan Co. Ltd., 1991, etc.). It was confirmed in the example of the present application that the composition of a target material of each layer is substantially the same as that of a thin film actually formed. However, depending upon a film-formation apparatus, film-formation conditions, a method for producing a target, and the like, the composition of a target material may be different from that of a thin film actually formed. In such a case, it is preferable that a correction coefficient for correcting a difference in composition is obtained previously from an empirical rule, and a target material composition is determined so as to obtain a thin film with a desired composition.

As the material for the protective substrate 7, the same materials as those for the transparent substrate 1 described above can be used. The protective substrate 7 may be made of a different material from that for the transparent substrate 1, and may not be necessarily transparent at a wavelength of the laser light 8. Furthermore, although there is no particular limit to the thickness of the protective substrate 7, the thickness can be set in a range of about 0.01 to 3.0 mm.

In the multi-layered film 21 of the optical information recording medium shown in FIGS. 1 and 2, the lower dielectric layer 2, the upper dielectric layer 4, and the reflective layer 6 are provided (the lower interface layer 10 and the upper interface layer 4 are provided further in the case of FIG. 2). However, only the recording layer 3 and the light absorbing layer 5 need to be provided.

Figure 3:
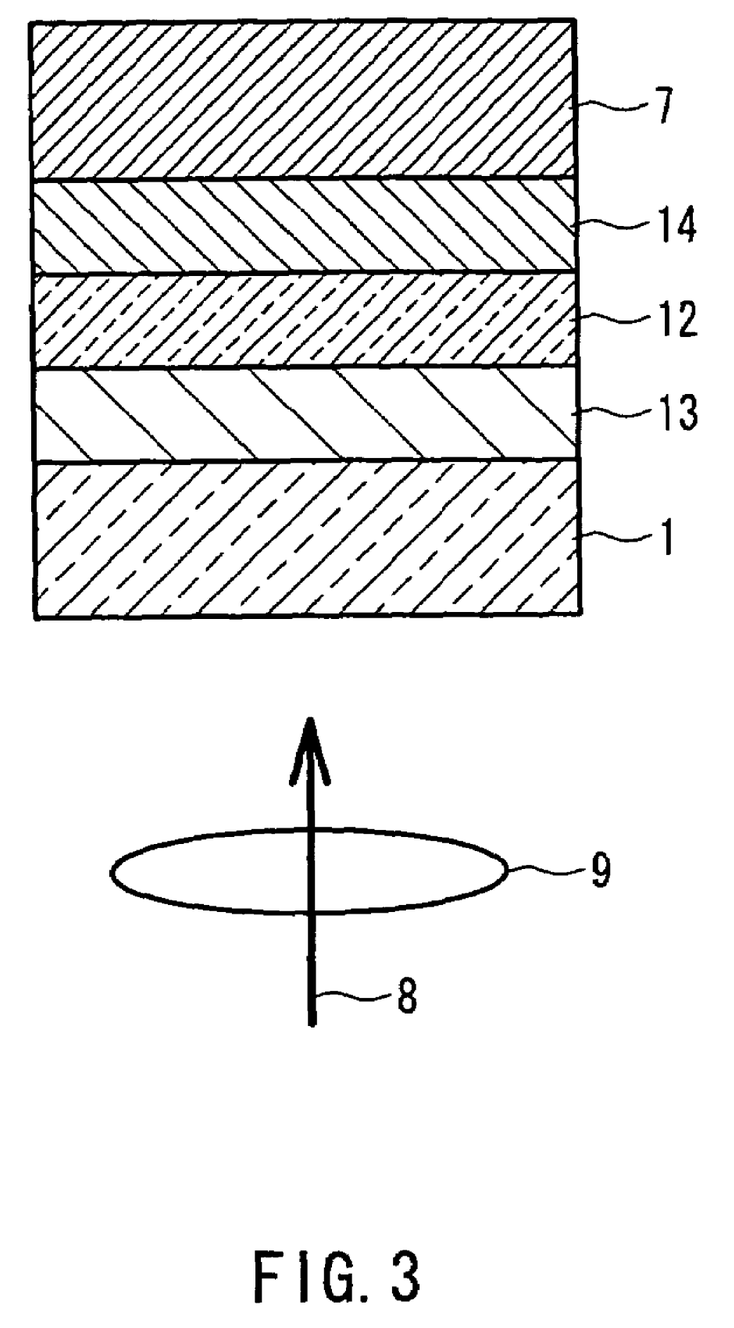
FIG. 3 is a cross-sectional view showing one exemplary configuration of the optical information recording medium of the present invention.
Figure 4:
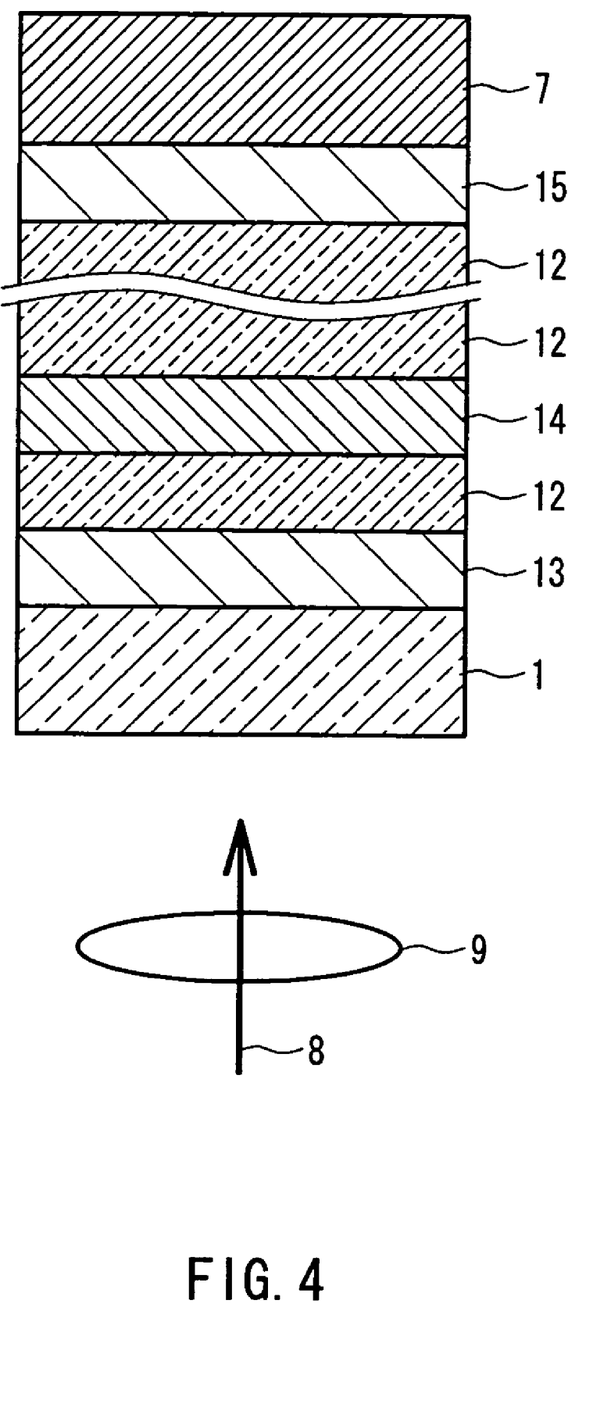
FIG. 4 is a cross-sectional view showing one exemplary configuration of the optical information recording medium of the present invention.

The optical information recording medium shown in FIGS. 1 and 2 as described above includes only one information layer. However, the optical information recording medium of the present embodiment may be a multi-layered recording medium in which a plurality of information layers are provided between the transparent substrate 1 and the protective substrate 7 via a separation layer 12 as shown in FIGS. 3 and 4. FIG. 3 shows an exemplary configuration in which two information layers (first information layer 13 and second information layer 14) are provided. FIG. 4 shows an exemplary configuration in which three or more information layers first information layer 13, second information layer 14, ... and an N-th information layer 15 (in the exemplary configuration shown in FIG. 4, N is an integer of 3 or more) are provided. In the case of such a multi-layered recording medium, it is necessary that at least one of the information layers has the same configuration as that of the multi-layered film 21 shown in FIG. 1 or 2. The laser light 8 is condensed from the transparent substrate 1 side to each information layer of the optical information recording medium by the objective lens 9, whereby information is recorded or reproduced. Among the plurality of information layers, those which are placed farther away from the transparent substrate 1 receive a smaller amount of laser. Therefore, it is necessary to set the recording density to be high for those layers. In the case of the multi-layered recording medium, it is preferable that at least the information layer (the second information layer 14 in FIG. 3, and the N-th information layer 15 in FIG. 4) placed farthest from the transparent substrate 1 has the same configuration as that of the multi-layered film 21. According to the configuration of the multi-layered film 21, high sensitivity can be obtained.

The separation layer 12 may be made of a UV-curable resin or the like. The thickness of the separation layer 12 desirably is at least the depth of focus determined by the numerical aperture NA of the objective lens 9 and the wavelength $\lambda$ of the laser light 8 so that, in reproducing information from one of the first information layer 13 and the second information layer 14, the crosstalk from the other becomes small. It also is necessary that all the information layers have a thickness in a range capable of condensing light. For example, it is preferable that the thickness of the separation layer 12 is in a range of 10 μm to 100 μm in the case where $\lambda=660$ nm and NA=0.6, and is in a range of 5 μm to 50 μm in the case where $\lambda=405$ nm and NA=0.85. If an optical system capable of reducing crosstalk between layers is developed, the thickness of the separation layer 12 may be made smaller.

It is desirable that the first information layer 13 has a transmittance of 30% or more. The first information layer 13 may be set to be a write-once type or a reproduction-only type, in addition to a rewritable type.

Two optical information recording media shown in FIGS. 1 to 4 are attached with the respective protective substrates 8 opposed to each other to obtain a double-sided configuration, whereby the amount of information that is accumulated in one medium can be doubled.

Each of the above-mentioned thin films can be formed, for example, by a vapor-phase thin film depositing method such as vacuum evaporation, sputtering, ion plating, chemical vapor deposition (CVD), a molecular beam epitaxy (MBE) method, or the like.

After the above-mentioned thin layers and the separation layer 12 are formed successively on the transparent substrate 1, the protective substrate 7 may be formed or attached. Alternatively, after each layer is formed successively on the protective substrate 7, the transparent substrate 1 may be formed or attached. In particular, the latter is suitable for the case where the transparent substrate 1 is thin (i.e., 0.4 mm or less). In this case, an uneven pattern of grooves for guiding laser light, an address signal, and the like are required to be formed on the surfaces of the protective substrate 7 and the separation layer 12 (i.e., required to be transferred from a stamper or the like where a desired uneven pattern has been formed). At this time, when the thickness is small as in the separation layer 12, and it is difficult to perform a usually used injection method, a photo-polymerization method (2P method) can be used.

The recording layer 3 of the optical information recording medium generally is amorphous when left formed. Therefore, initialization processing (i.e., annealing the recording layer 3 with laser light or the like to set the recording layer 3 to be in a crystalline state) is performed, whereby a complete disk is obtained, and information can be recorded or reproduced.

Figure 5:
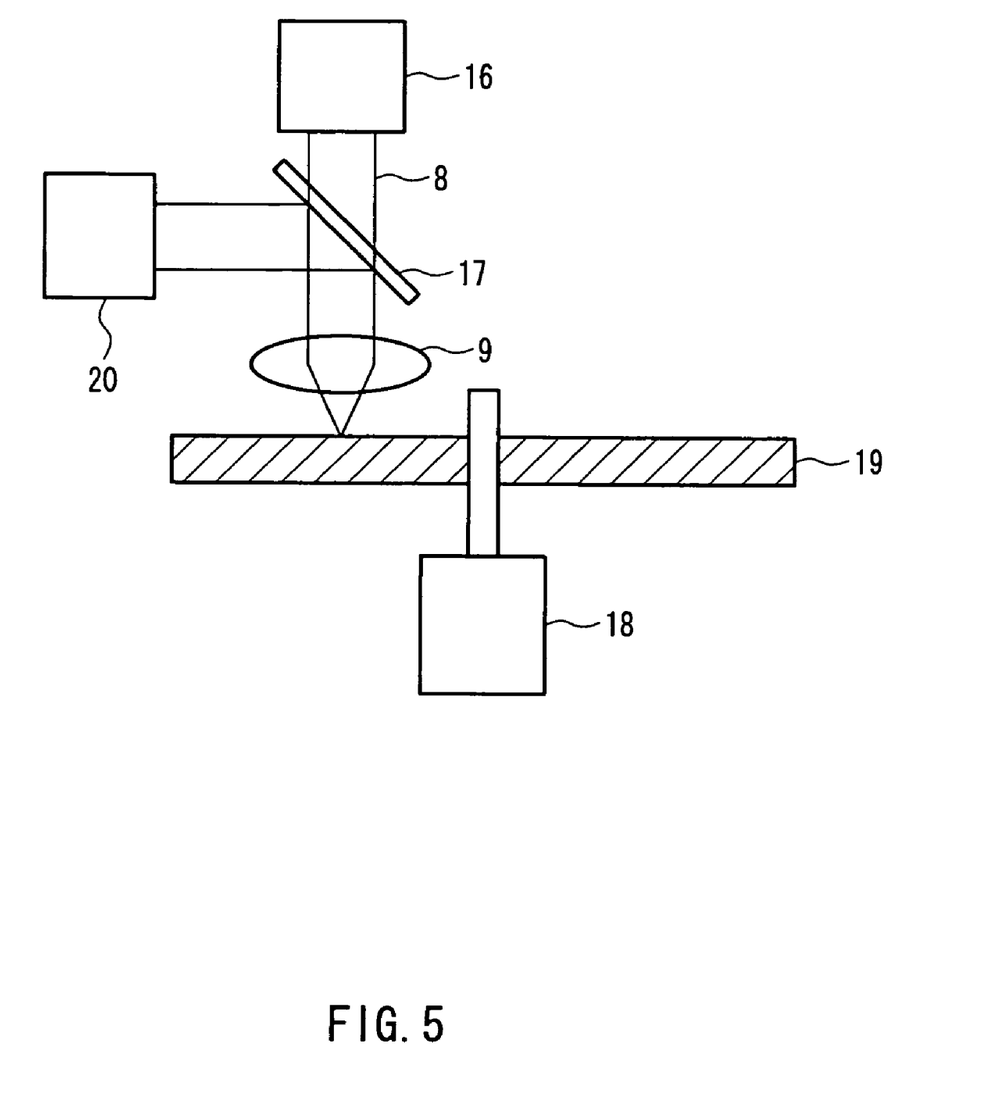
FIG. 5 is a view schematically showing an exemplary recording and reproducing apparatus of the optical information recording medium of the present invention.

FIG. 5 is a schematic view showing an example of the basic configuration of a recording and reproducing apparatus for performing recording and reproducing with respect to an optical information recording medium, as an example of the recording apparatus of the present invention. Laser light 8 output from a laser diode 16 passes through a half-mirror 17 and an objective lens 9 to be focused onto an optical information recording medium (disk) 19 rotated by a motor 18. Information is reproduced by allowing reflected light from the medium 19 to be incident upon a photodetector 20, and detecting a signal.

Figure 6:
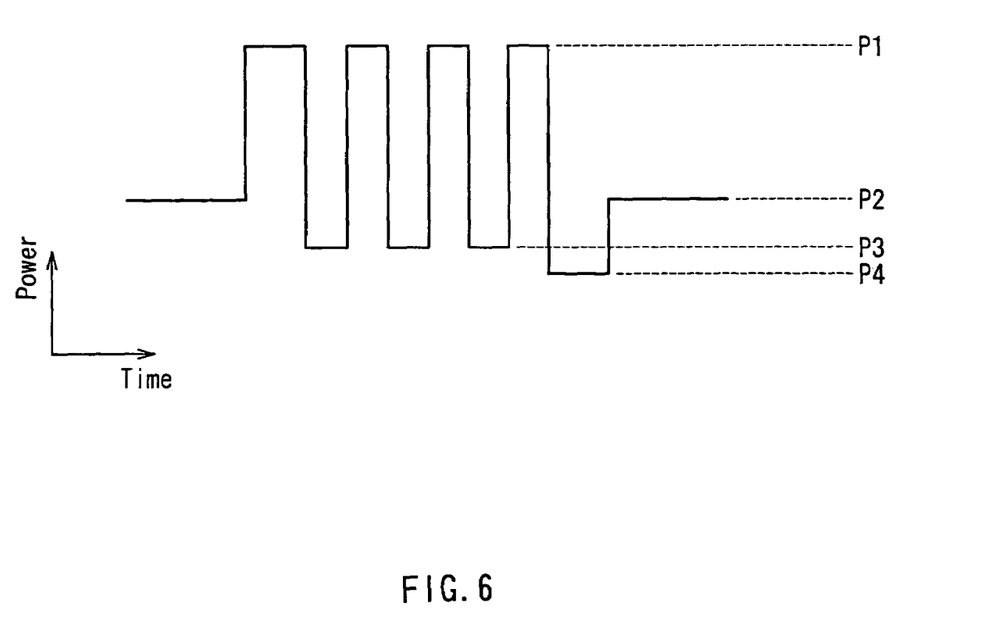
FIG. 6 is a view schematically showing an exemplary recording pulse waveform used for recording and reproducing of the optical information recording medium of the present invention.

In recording an information signal, the intensity of the laser light 8 is modulated between a plurality of power levels. As means for modulating laser light intensity, a current modulation unit for modulating a driving current of a semiconductor laser may be used. Alternatively, an electrooptical modulator, an acoustic optical modulator, or the like may be used. A single rectangular pulse with a peak power P1 may be used in a portion where a recording mark is to be formed. However, in the case of forming a particularly long mark, for the purpose of eliminating excess heat and making a mark width uniform, a recording pulse string composed of a plurality of pulse strings modulated between the peak power P1 and a bottom power P3 (P1>P3) as shown in FIG. 6 is used. Furthermore, a cooling interval for a cooling power P4 may be provided after the trailing pulse. In a portion where a mark is not formed, a bias power P2 (P1>P2) is kept constant.

By setting a laser power modulation pulse waveform for forming a recording mark so that the value obtained by dividing a time integration of a light-emission power by a maximum light-emission power is increased with an increase in a linear velocity, satisfactory recording and reproducing characteristics can be kept in a wider range of linear velocity. The value obtained by dividing a time integration of a light-emission power by a maximum light-emission power can be increased specifically by enlarging a part or the whole of each pulse with the peak power P1 in the pulse waveform shown in FIG. 6, or enhancing the power level P3. This has an effect of enhancing an erasure ratio particularly at a high linear velocity.

Herein, depending upon each pattern such as the length of a mark to be recorded, the length of a space before and after a mark, and the like, unevenness is caused at a mark edge position, causing an increase in jitter. According to the recording method of an optical information recording medium of the present invention, in order to prevent the above problem and suppress jitter, the position or length of each pulse of the above-mentioned pulse string are adjusted, if required, so that an edge position is aligned on a pattern basis, whereby the unevenness of mark edges can be compensated.

According to the present invention, the following may be possible: two or more modes are applied for recording information; a medium is rotated at two or more linear velocities varied in accordance with the two or more modes; two or more laser power modulation pulse waveforms varied in accordance with the two or more linear velocities are used; and the two or more laser power modulation pulse waveforms are set so that the value obtained by dividing a time integration of a light-emission power by a maximum light-emission power is increased with an increase in the linear velocity.

EXAMPLES

Hereinafter, the present invention will be described more specifically by way of examples. However, the present invention is not limited to the following examples.

Example 1

In Example 1, the optical information recording media having a configuration shown in FIG. 2 were produced. As a transparent substrate, a substrate made of polycarbonate resin, having a diameter of 12 cm, a thickness of 0.6 mm, a groove pitch of 1.23 μm, and a groove depth of about 55 nm was prepared. A lower dielectric layer (thickness: 130 nm) made of $(ZnS)_{80}(SiO_2)_{20}$, a lower interface layer (thickness: 2 nm) made of $(ZrO_2)_{25}(SiO_2)_{25}(Cr_2O_3)_{50}$, a recording layer (thickness: 9 nm) formed of various material compositions, an upper interface layer (thickness: 2 nm) made of $(ZrO_2)_{25}(SiO_2)_{25}(Cr_2O_3)_{50}$, an upper dielectric layer (thickness: 40 nm) made of $(ZnS)_{80}(SiO_2)_{20}$, a light absorbing layer (thickness: 25 nm) made of $CrSi_2$, and a reflective layer (thickness: 80 nm) made of $Ag_{98}Pd_1Cu_1$ were stacked successively on the surface of the transparent substrate with grooves formed thereon by sputtering. The refractive index n of the material used for the lower dielectric layer was 2.1.

As the recording layer, as shown in Table 1, $Ge_{40}Sb_8Te_{52}$ (Disk 1), $Ge_{40}Sb_8Te_{52}$ with Ge partially replaced by Sn (Disks 2 to 5), and $Ge_{40}Sb_8Te_{52}$ with Sb partially replaced by Bi (Disks 6 to 9) were used. Table 1 also shows the values of x and y when the material used for the recording layers of Disks 6 to 9 is represented by a formula: $Ge_x(Bi_ySb_{1-y})_2Te_{x+3}$.

TABLE 1

| | Composition ratio of a recording layer (atomic %) | | | | | $Ge_x(Bi_ySb_{1-y})_2Te_{x+3}$ | | 8.2 m/s | | 20.5 m/s | |
|---|---|---|---|---|---|---|---|---|---|---|---|
| Disk No. | Ge | Sn | Sb | Bi | Te | x | y | C/N ratio | Erasure ratio | C/N ratio | Erasure ratio |
| 1 | 40 | 0 | 8 | 0 | 52 | — | — | ⊙ | ○ | ⊙ | x |
| 2 | 35 | 5 | 8 | 0 | 52 | — | — | ○ | ⊙ | ⊙ | Δ |
| 3 | 30 | 10 | 8 | 0 | 52 | — | — | Δ | ⊙ | ○ | ○ |
| 4 | 25 | 15 | 8 | 0 | 52 | — | — | x | ⊙ | ○ | ⊙ |
| 5 | 20 | 20 | 8 | 0 | 52 | — | — | x | ⊙ | Δ | ⊙ |
| 6 | 40 | 0 | 6 | 2 | 52 | 10 | 0.25 | ⊙ | ⊙ | ⊙ | ○ |
| 7 | 40 | 0 | 4 | 4 | 52 | 10 | 0.5 | ⊙ | ⊙ | ⊙ | ⊙ |

TABLE 1-continued

| | | | | | | | | | | | |
|---|---|---|---|---|---|---|---|---|---|---|---|
| 8 | 40 | 0 | 2 | 6 | 52 | 10 | 0.75 | ○ | ⊚ | ⊚ | ⊚ |
| 9 | 40 | 0 | 0 | 8 | 52 | 10 | 1 | ○ | ⊚ | ○ | ⊚ |

<Definition of each symbol>

| | C/N ratio | Erasure ratio |
|---|---|---|
| ⊚ | 55 dB or more | 34 dB or more |
| ○ | 52 dB to less than 55 dB | 30 dB to less than 34 dB |
| Δ | 49 dB to less than 52 dB | 26 dB to less than 30 dB |
| x | Less than 49 dB | Less than 26 dB |

The recording layer was formed while an Ar—$N_2$ mixed gas ($N_2$ partial pressure: about 3%) was flowing as sputtering gas, and the other layers were formed while only Ar was flowing as sputtering gas.

A protective substrate made of polycarbonate resin was attached to the multi-layered thin film thus formed via UV-curable resin, and the resultant multi-layered thin film was irradiated with UV-light to cure the resin. The disk thus obtained was annealed with laser light from the transparent substrate side, whereby the entire recording layer was initialized.

These disks were rotated under two conditions (at a linear velocity of 8.2 m/s (reference clock T=17.1 ns) and a linear velocity of 20.5 m/s (reference clock T=6.9 ns)), and they were measured with an optical system (wavelength: 660 nm; NA: 0.6). At both the linear velocities, a 3 T signal and a 11 T signal were recorded alternately 11 times on grooves and lands. Information was reproduced from the tracks under the condition that the 3 T signal has been recorded, and a C/N ratio was measured by a spectrum analyzer. Then, the erasure ratio when a 11 T signal further was recorded once (i.e., the attenuation ratio of a 3 T signal amplitude) was measured by a spectrum analyzer.

The laser modulation waveform in recording a signal was set as follows. At both the linear velocities, a single rectangular pulse with a width of 1.5 T (power level P1) was used in the case of the 3 T signal, and a pulse string (power level P1) including a leading pulse with a width of 1.5 T and subsequent 8 sub-pulses with a width of 0.5 T was used in the case of the 11 T signal. The width between the respective pulses (power level P3) was set to be 0.5 T. In a portion where a mark was not recorded, continuous light at the power level P2 was used. In the case of a linear velocity of 8.2 m/s, P3=P2. In the case of a linear velocity of 20.5 m/s, P3=P2+1 mW. Each power level was determined as follows. The recording power level P1 was set to be 1.5 times the lower limit value of a power at which the C/N ratio exceeded 45 dB, and the power level P2 was set to be a central value in a range of a power at which the erasure ratio exceeded 20 dB. The reproducing power level P5 was set to be 1.0 mW.

The C/N ratio and erasure ratio of each disk were measured under the above conditions. Table 1 shows the results. The C/N ratio and the erasure ratio were not varied largely between the groove and the land in each disk. Table 1 shows lower values.

In Disk 1 including the recording layer made of Ge—Sb—Te, although a satisfactory C/N ratio and erasure ratio are obtained at 8.2 m/s, an erasure ratio is poor at 20.5 m/s. Thus, it is understood that the crystallization speed of the recording layer is insufficient. In Disks 2 to 5 including the recording layer made of Ge—Sn—Sb—Te with Ge partially replaced by Sn, as the Sn amount is increased from 5 atomic % to 20 atomic %, the crystallization speed becomes high. Therefore, while the erasure ratio at 20.5 m/s is enhanced, the recording layer is unlikely to be amorphous at 8.2 m/s. Consequently, the C/N ratio is decreased, and satisfactory recording and reproducing characteristics cannot be realized simultaneously at two linear velocities. In contrast, in Disks 6 to 9 including the recording layer made of Ge—Sn—Sb—Te with Sb partially replaced by Bi, a sufficient erasure ratio is obtained at 20.5 m/s merely by increasing the Bi amount to 2 to 8 atomic %, and the C/N ratio at 8.2 m/s is kept high.

From the above results, it is understood that, by using a light absorbing layer made of a Si alloy or the like and a recording layer made of a Ge—Sb—Bi—Te material, satisfactory recording and reproducing characteristics can be obtained in a wide range of linear velocity.

Example 2

Disks, in which the thicknesses of the lower dielectric layers of Disks 3 and 7 in Example 1 were varied in a range of 100 nm to 150 nm, were produced by the same method as that in Example 1, and these disks were evaluated in the same way as in Example 1. Table 2 shows the results.

TABLE 2

| Disk No. | Material for a recording layer | Thickness of a lower dielectric layer | Reflectance | 8.2 m/s C/N ratio | 8.2 m/s Erasure ratio | 20.5 m/s C/N ratio | 20.5 m/s Erasure ratio |
|---|---|---|---|---|---|---|---|
| 10 | Ge—Sn—Sb—Te | 150 nm | ○ | x | ⊚ | Δ | ○ |
| 11 | | 140 nm | ⊚ | Δ | ⊚ | ○ | ○ |
| 12 | | 130 nm | Δ | Δ | ⊚ | ○ | ○ |
| 13 | | 120 nm | x | x | ⊚ | Δ | ○ |
| 14 | | 110 nm | x | x | ⊚ | x | ○ |
| 15 | | 100 nm | x | x | ⊚ | x | ○ |
| 16 | Ge—Sb—Bi—Te | 150 nm | ⊚ | ○ | ⊚ | ○ | ⊚ |
| 17 | | 140 nm | ⊚ | ○ | ⊚ | ○ | ⊚ |
| 18 | | 130 nm | ⊚ | ⊚ | ⊚ | ⊚ | ⊚ |
| 19 | | 120 nm | ○ | ⊚ | ⊚ | ⊚ | ⊚ |

TABLE 2-continued

| 20 | 110 nm | ○ | ⊚ | ⊚ | ⊚ | ⊚ |
| 21 | 100 nm | ○ | ○ | ⊚ | ⊚ | ⊚ |

<Definition of each symbol>

| | Reflectance | C/N ratio | Erasure ratio |
|---|---|---|---|
| ⊚ | 18% or more | 55 dB or more | 34 dB or more |
| ○ | 15% to less than 18% | 52 dB to less than 55 dB | 30 dB to less than 34 dB |
| Δ | 12% to less than 15% | 49 dB to less than 52 dB | 26 dB to less than 30 dB |
| x | Less than 12% | Less than 49 dB | Less than 26 dB |

In each disk in the present example, the reflectance was measured in a mirror surface portion without grooves, which also is shown in Table 2.

According to Table 2, in Disks 10 to 15 with the thickness of the lower dielectric layer of Disk 3 of Example 1 varied, the reflectance becomes maximum when the thickness of the lower dielectric layer is in the vicinity of 140 nm; however, the reflectance is lower than 15% when the thickness of the lower dielectric layer is 130 nm or less. In contrast, in Disks 16 to 21 with the thickness of the lower dielectric layer of Disk 7 of Example 1 varied, even if the thickness of the lower dielectric layer is decreased up to 100 nm, the reflectance of 15% or more is maintained. Furthermore, the C/N ratio and the erasure ratio are sufficient at both the linear velocities of 8.2 m/s and 20.5 m/s. In particular, the C/N ratio and the erasure ratio exhibit satisfactory results at 120 to 130 nm.

It is understood from the above results that, by using a light absorbing layer made of a Si alloy or the like and a recording layer made of a Ge—Sb—Bi—Te material, and by setting the thickness of the lower dielectric layer to be 135 nm or less, more satisfactory recording and reproducing characteristics can be obtained in a wide range of linear velocity.

As described above, according to the present invention, a recording medium that enables satisfactory recording and reproducing characteristics to be obtained at high density in a wide range of linear velocity, and that can be produced at a low cost, a production method thereof, a recording method, and a recording apparatus can be provided.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical information recording medium, comprising a transparent substrate and a multi-layered film provided on the transparent substrate,
   wherein the multi-layered film includes at least a recording layer that is changed between two or more different states capable of being detected optically by irradiation with a light beam, and a light absorbing layer in this order from a side close to the transparent substrate, and
   the recording layer contains a material represented by a formula: $(Ge_x(Bi_ySb_{1-y})_2Te_{x+3}$ (where $x \geq 5$ and $0 < y \leq 1$) as a main component.

2. The optical information recording medium according to claim 1, comprising a first information layer to an N-th information layer (N is an integer of 2 or more) disposed on the transparent substrate in this order from a side close to the transparent substrate, and
   at least one of the first information layer to the N-th information layer is the multi-layered film.

3. The optical information recording medium according to claim 1, wherein, assuming that a refractive index of the light absorbing layer is $n_1$, and an extinction coefficient of the light absorbing layer is $k_1$, $3 \leq n_1 \leq 6$ and $1 \leq k_1 \leq 4$.

4. The optical information recording medium according to claim 1, wherein the light absorbing layer contains at least one element selected from the group consisting of Ti, Zr, Hf, V, Nb, Ta, Cr, Mo, W, Mn, Os, Ga, In, C, Si, Ge, Sn, Pb, Sb, and Bi.

5. The optical information recording medium according to claim 4, wherein the light absorbing layer contains at least one element selected from the group consisting of Si and Ge.

6. The optical information recording medium according to claim 1, wherein the multi-layered film further includes a lower dielectric layer disposed on a side close to the transparent substrate with respect to the recording layer.

7. The optical information recording medium according to claim 6, wherein a thickness of the lower dielectric layer is 135 nm or less.

8. The optical information recording medium according to claim 6, wherein, assuming that a thickness of the lower dielectric layer is d, a refractive index of the lower dielectric layer is $n_2$, and a wavelength of a light beam used for recording or reproducing is $\lambda$, $n_2 d \leq 7\lambda/16$.

9. The optical information recording medium according to claim 8, wherein $0 < n_2 d \leq 3\lambda/16$ or $\lambda/4 \leq n_2 d \leq 7\lambda/16$.

10. The optical information recording medium according to claim 6, wherein the multi-layered film further includes a lower interface layer between the lower dielectric layer and the recording layer.

11. The optical information recording medium according to claim 10, wherein the lower interface layer is made of a material containing at least one kind of oxide selected from the group consisting of oxides of Ti, Zr, Hf, V, Nb, Ta, Cr, Mo, W, and Si as a main component.

12. The optical information recording medium according to claim 1, wherein the multi-layered film further includes an upper dielectric layer disposed on an opposite side of the transparent substrate with respect to the recording layer.

13. The optical information recording medium according to claim 12, wherein a thickness of the upper dielectric layer is in a range of 15 nm to 80 nm.

14. The optical information recording medium according to claim 13, wherein a thickness of the upper dielectric layer is in a range of 25 nm to 60 nm.

15. The optical information recording medium according to claim 12, wherein the multi-layered film further includes an upper interface layer between the recording layer and the upper dielectric layer.

16. The optical information recording medium according to claim 15, wherein the upper interface layer is made of a material containing at least one kind of oxide selected from the group consisting of oxides of Ti, Zr, Hf, V, Nb, Ta, Cr, Mo, W, and Si as a main component.

17. The optical information recording medium according to claim 1, wherein the multi-layered film further includes a reflective layer disposed on an opposite side of the transparent substrate with respect to the light absorbing layer.

18. A method for producing an optical information recording medium comprising, on a transparent substrate, a multi-layered film including at least a recording layer that is changed between two or more different states capable of being detected optically by irradiation with a light beam, and a light absorbing layer in this order from a side close to the transparent substrate, wherein the recording layer is formed so as to contain a material represented by a formula: $Ge_x(Bi_ySb_{1-y})_2Te_{x+3}$ (where $x \geq 5$ and $0 < y \leq 1$) as a main component.

19. The method for producing an optical information recording medium according to claim 18, the medium comprising a first information layer to an N-th information layer (N is an integer of 2 or more) disposed on the transparent substrate in this order from a side close to the transparent substrate, wherein at least one of the first information layer to the N-th information layer is formed as the multi-layered film.

20. The method for producing an optical information recording medium according to claim 18, wherein, in the multi-layered film, a lower dielectric layer to be disposed on a side close to the transparent substrate with respect to the recording layer is formed so as to have a thickness of 135 nm or less.

21. An information recording method for recording information onto an optical information recording medium comprising, on a transparent substrate, a multi-layered film including at least a recording layer that is changed between two or more different states capable of being detected optically by irradiation with a light beam, and a light absorbing layer in this order from a side close to the transparent substrate, wherein the recording layer contains a material represented by a formula: $Ge_x(Bi_ySb_{1-y})_2Te_{x+3}$ (where $x \geq 5$ and $0 < y \leq 1$) as a main component, and while the medium is rotated, the information is recorded with a laser power modulation pulse waveform set in such a manner that as a linear velocity of the medium is increased, a value obtained by dividing a time integration of a light-emission power by a maximum light-emission power is higher.

22. The information recording method according to claim 21, wherein the optical information recording medium includes a first information layer to an N-th information layer (N is an integer of 2 or more) disposed on the transparent substrate in this order from a side close to the transparent substrate, and at least one of the first information layer to the N-th information layer is formed as the multi-layered film.

23. An information recording apparatus for recording information onto an optical information recording medium comprising, on a transparent substrate, a multi-layered film including at least a recording layer that is changed between two or more different states capable of being detected optically by irradiation with a light beam, and a light absorbing layer in this order from a side close to the transparent substrate, wherein the recording layer contains a material represented by a formula: $Ge_x(Bi_ySb_{1-y})_2Te_{x+3}$ (where $x \geq 5$ and $0 < y \leq 1$) as a main component, and while the medium is rotated, the information is recorded with a laser power modulation pulse waveform set in such a manner that as a linear velocity of the medium is increased, a value obtained by dividing a time integration of a light-emission power by a maximum light-emission power is higher.

24. The information recording apparatus according to claim 23, wherein the optical information recording medium includes a first information layer to an N-th information layer (N is an integer of 2 or more) disposed on the transparent substrate in this order from a side close to the transparent substrate, and at least one of the first information layer to the N-th information layer is formed as the multi-layered film.

* * * * *